United States Patent
Kim et al.

(10) Patent No.: US 6,847,766 B2
(45) Date of Patent: Jan. 25, 2005

(54) OPTICAL FIBER ALIGNMENT SYSTEM

(75) Inventors: Sang-Ho Kim, Kumi (KR); Yeong-Seop Lee, Kumi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 230 days.

(21) Appl. No.: 10/306,445

(22) Filed: Nov. 27, 2002

(65) Prior Publication Data

US 2003/0113069 A1 Jun. 19, 2003

(30) Foreign Application Priority Data

Dec. 17, 2001 (KR) .................... 10-2001-0079908

(51) Int. Cl.[7] .................. G02B 6/26; G02B 6/00
(52) U.S. Cl. ................. 385/52; 385/137; 385/147
(58) Field of Search ..................... 385/52, 65, 83, 385/134, 137, 147

(56) References Cited

U.S. PATENT DOCUMENTS

| | | | |
|---|---|---|---|
| 5,185,846 A | * | 2/1993 | Basavanhally et al. ..... 385/137 |
| 6,571,041 B2 | * | 5/2003 | Bourcier et al. .............. 385/52 |
| 6,690,865 B2 | * | 2/2004 | Miyazaki ..................... 385/52 |
| 2003/0002847 A1 | * | 1/2003 | Shekel et al. ............... 385/147 |

* cited by examiner

Primary Examiner—John D. Lee
Assistant Examiner—Sarah Song
(74) Attorney, Agent, or Firm—Cha & Reiter, L.L.C.

(57) ABSTRACT

An optical fiber alignment system for mounting optical fiber arrays on an optical fiber block having a plurality of grooves on its upper surface according to the present invention comprises jig assemblies including a first jig for propping up a part of the optical fiber arrays and a second jig for adsorbing and fixing the other part of the optical fiber arrays using a plurality of vacuum holes formed on the upper side; X-Y-Z-$\theta_X$-$\theta_Y$-$\theta_Z$ stages for translating and rotating the jig assemblies in 3D to align the optical fiber arrays on the block; a vision unit including an image detector to monitor the alignment process of the optical fiber arrays and a display for displaying the image signal on a screen; and, an vision unit translator for translating the vision unit in 3D.

11 Claims, 8 Drawing Sheets

OPTICAL FIBER ALIGNMENT SYSTEM

This application claims priority to an application entitled "OPTICAL FIBER ALIGNMENT SYSTEM," filed in the Korean Industrial Property Office on Dec. 17, 2001 and assigned Serial No. 2001-79908, the contents of which are hereby incorporated by reference.

BACKGROUND OF THE INVENTION

1. Field of the Invention

The present invention generally relates to an optical fiber block and in particular, to an optical fiber alignment system for mounting optical fiber arrays on the optical fiber block.

2. Description of the Related Art

In general, an optical fiber block consists of a block with a plurality of V-grooves on its upper side on which optical fiber arrays are mounted and a glass lid covering the optical fiber arrays. The optical fiber block can be used to connect an optical fiber ribbon to the input end or the output end of a planar lightwave circuit. The optical fiber ribbon consists of an optical fiber array with each optical fiber made of a core and cladding, which is made of materials such as thermosetting resin, UV curing resin, etc.

Briefly, a conventional method of manufacturing the optical fiber block comprises steps of: removing a part of the outer cover of the optical fiber ribbon; aligning the optical fiber array on the V-grooves; spreading adhesives on the optical fiber array; covering the optical fiber array with the glass lid; and, polishing a cross section of the optical fiber array in a desired angle.

The conventional method of aligning the optical fiber array on the V-grooves with each tooth positioned in a 250 $\mu$m interval is performed manually by an operator using farsighted glasses. When aligning the optical fiber array on the V-grooves at a 127 $\mu$m interval, a optical fiber ribbon consisting of plural optical fibers with a 250 $\mu$m interval is used typically. The process of aligning first and second optical fiber ribbons, each one consisting of plural optical fibers with a 250 $\mu$m interval is performed by inserting a first optical fiber array of the first optical fiber ribbon between a second optical fiber array of the second optical fiber ribbon.

Accordingly, the process involving a user's manual input tend to have undesirable human errors, thus degrading the quality and its productivity.

SUMMARY OF THE INVENTION

The present invention relates to an optical fiber alignment system for aligning optical fibers easily and in a stable manner on an optical block during the manufacturing stage of an optical fiber block.

According to one aspect of the invention, there is provided an optical fiber alignment system for mounting optical fiber arrays on a block having a plurality of grooves on its upper side, comprising: jig assemblies comprising a first jig for propping up a part of the optical fiber arrays, and a second jig for adsorbing and fixing the part of the optical fiber arrays using a plurality of vacuum holes formed on the upper side; X-Y-Z-$\theta_x$-$\theta_y$-$\theta_z$ stages for translating and rotating the jig assemblies in 3D in order to align the optical fiber arrays on the block; a vision unit comprising an image detector for outputting an image signal for an input image in order to monitor the alignment process of the optical fiber arrays and a display for displaying the image signal on a screen; and, a vision unit translator for translating the vision unit in 3D.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purposes of clarity and simplicity, well-known functions or constructions are not described in detail as they would obscure the invention in unnecessary detail.

Figure 1:
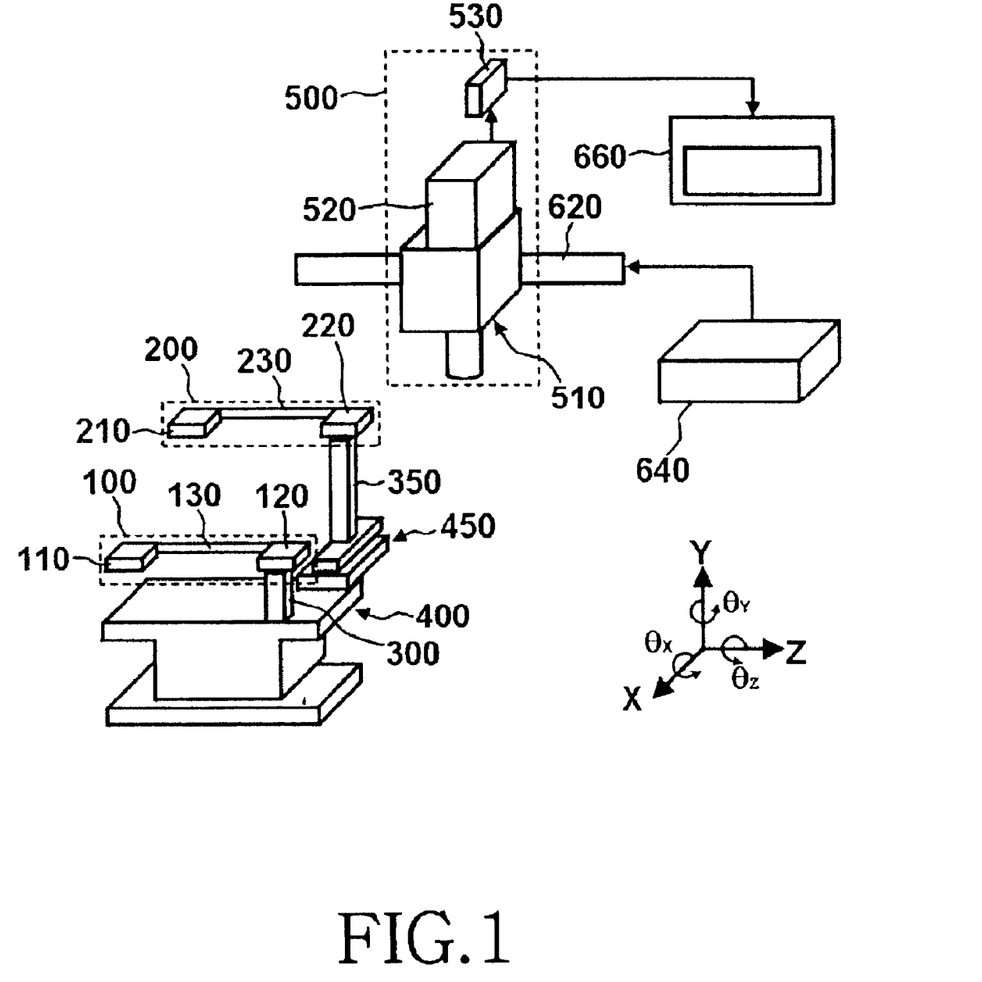
FIG. 1 is a schematic diagram illustrating a configuration of an optical fiber alignment system according to a preferred embodiment of the present invention.

FIG. 1 is a schematic diagram illustrating the configuration of an optical fiber alignment system according to a preferred embodiment of the present invention. The optical fiber alignment system includes first and second jig assemblies 100, 200, first and second vertical supporters 300 and 350, first and second X-Y-Z-$\theta_x$-$\theta_y$-$\theta_z$ stages 400, 450, a vision unit 500, a display 660, a vision unit translator 620, and a translate controller 640.

Figure 2:
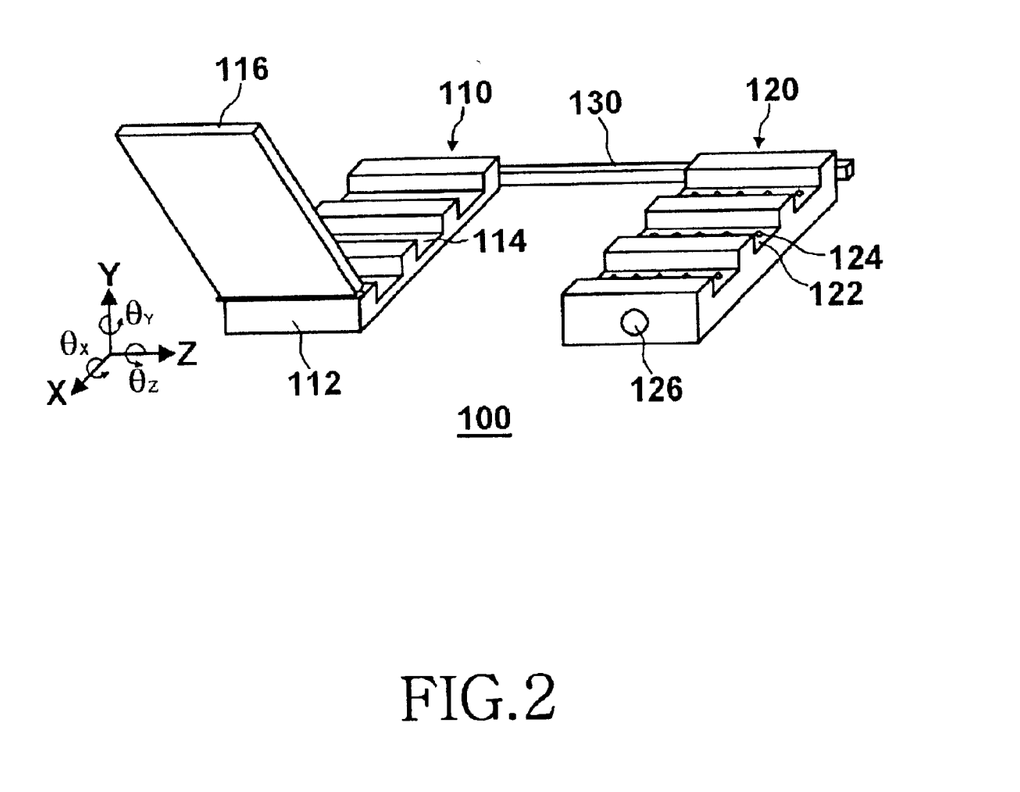
FIG. 2 is a diagram illustrating a configuration of a first jig assembly in FIG. 1 on which a first optical fiber array is not mounted.
Figure 3:
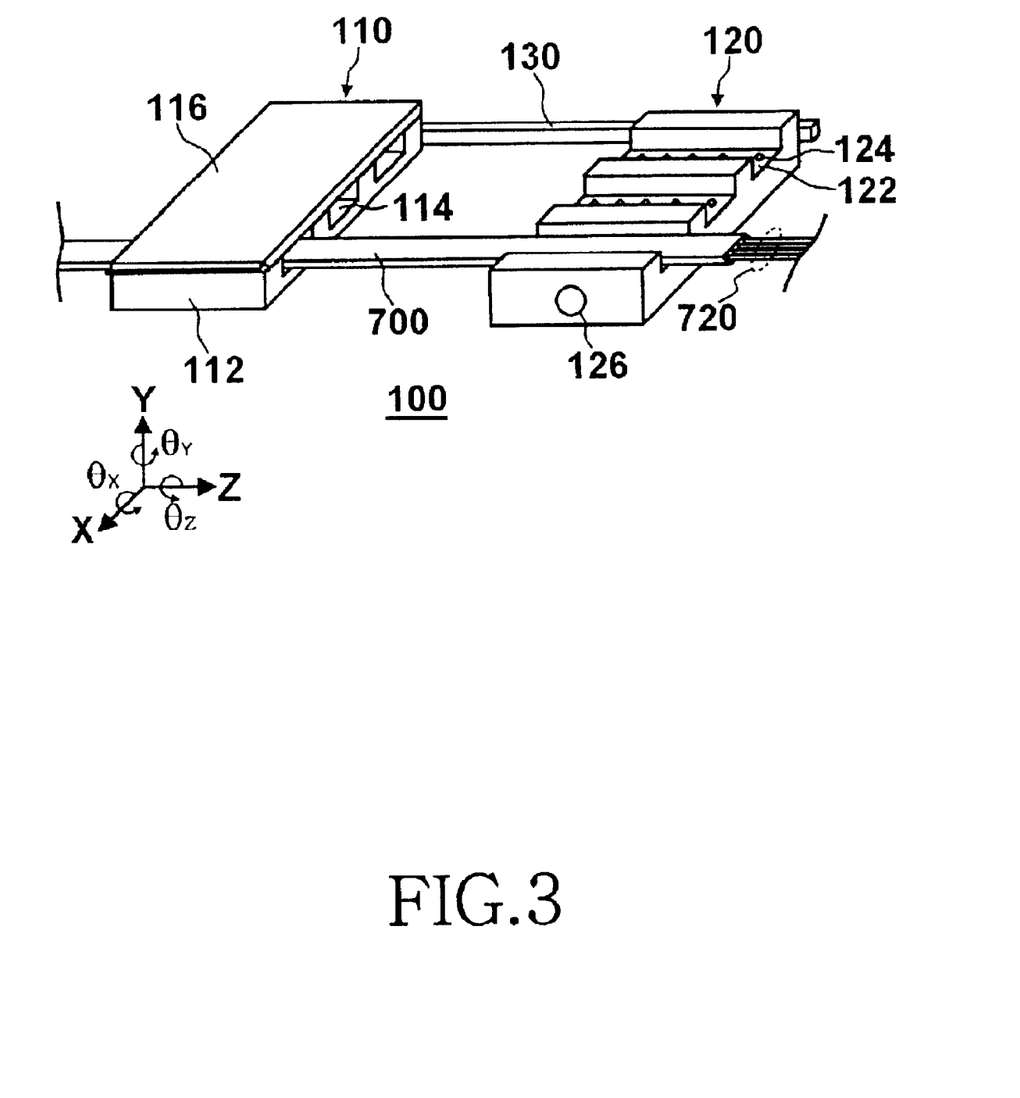
FIG. 3 is a diagram illustrating a configuration of a first jig assembly in FIG. 1 on which the first optical fiber array is mounted.

FIG. 2 is a diagram illustrating the configuration of a first jig assembly of FIG. 1 without a first optical fiber array mounted thereon, and FIG. 3 is a diagram illustrating the configuration of a first jig assembly of FIG. 1 on which the first optical fiber array is mounted. As shown in FIGS. 2 and 3, the first jig assembly 100 includes first and second jigs 110, 120, and a first horizontal supporter 130. The first jig 110 comprises a metal substrate 112 onto which a plurality of square-type grooves 114 are formed on its upper surface and a cover 116 with a magnetic property hinged at one end of the substrate 112. In the embodiment, the thickness and width of each groove 114 are set selectively according to the thickness and width of the first optical fiber ribbon 700 to be mounted on the grooves 114.

The second jig 120 includes a plurality of square-type grooves 122 on its upper surface. A first exhaust port 126 is formed at one end of the second jig 120 and connected to a vacuum pump (not shown) through a vacuum tube. A plurality of holes 124 are formed on the bottom surface of the grooves 122 and connected to the first exhaust port 126. When the vacuum pump is operated, the first optical fiber ribbon 700 is attached fixably to the grooves 122 due to the force provided through the holes 124. The first horizontal supporter 130 is attached fixably to each end of the first and second jigs 110 and 120 that are positioned apart in a predetermined distance.

Referring back to FIG. 1, the upper side of the first vertical supporter 300 is fixably attached to the lower surface of the second jig 120, and the lower surface of the first vertical supporter 300 is fixed to the first X-Y-Z-$\theta_X$-$\theta_Y$-$\theta_Z$ stage 400.

The first X-Y-Z-$\theta_X$-$\theta_Y$-$\theta_Z$ stage 400 is operative to translate or rotate the first vertical supporter 300 in three dimensions. Namely, the stage 400 translates the first vertical supporter 300 linearly in the direction of the X-axis, Y-axis or Z-axis, and rotates the first vertical supporter 300 around the X-axis, Y-axis or Z-axis in a predetermined angle ($\theta_X$,$\theta_Y$, or $\theta_Z$).

Figure 4:
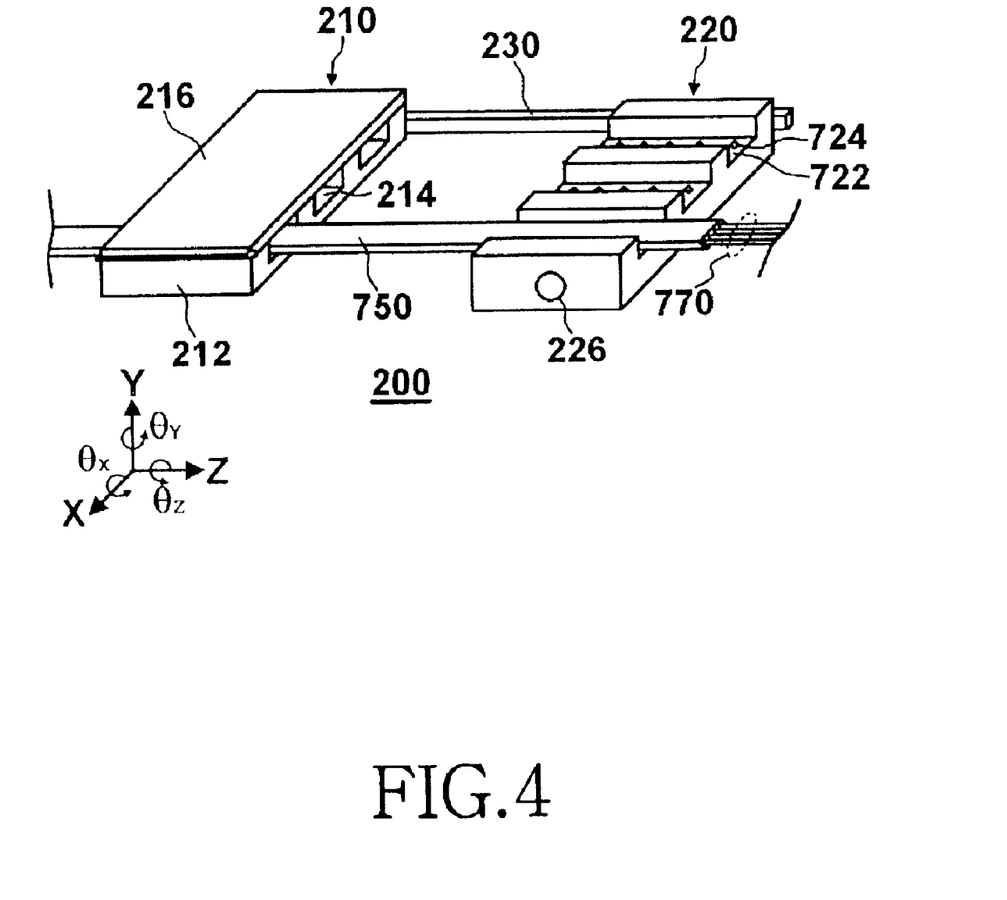
FIG. 4 is a diagram illustrating a configuration of a second jig assembly in FIG. 1 on which a second optical fiber array is mounted.

FIG. 4 is a diagram illustrating the configuration of a second jig assembly of FIG. 1 on which a second optical fiber array is mounted. As shown in FIG. 4, the second jig assembly 200 comprises third and fourth jigs 210 and 220, and a second horizontal supporter 230. The third jig 210 comprises a metal substrate 212 to which a plurality of square-type grooves 214 are formed on its upper surface and a cover 216 with a magnetic property hinged with one end of the substrate 212. The thickness and width of each groove 214 are set selectively according to the thickness and width of the second optical fiber ribbon 750 to be mounted on the grooves 214.

The fourth jig 220 includes a plurality of square-type grooves 722 on its upper side. A second exhaust port 226 is formed at one end of the fourth jig 220 and connected to a vacuum pump (not shown) through a vacuum tube. A plurality of holes 724 are formed on the bottom side of grooves 722 and connected to the second exhaust port 226. When the vacuum pump is operated, the second optical fiber ribbon 750 is fixably attached to the grooves 722 due to the vacuum force provided through the holes 724.

The second horizontal supporter 230 is fixably attached to each end of the third and fourth jigs 210 and 220 and spaced a part by a predetermined distance. The upper side of the second vertical supporter 350 is attached to the lower side of the fourth jig 220, and the lower side of the second vertical supporter 350 is fixed to the second X-Y-Z-$\theta_X$-$\theta_Y$-$\theta_Z$ stage 450. The second X-Y-Z-$\theta_X$-$\theta_Y$-$\theta_Z$ stage 450 translates or rotates the second vertical supporter 350 in three dimensions. Namely, it translates the second vertical supporter 350 linearly in the direction of X-axis, Y-axis or Z-axis, and rotates the second vertical supporter 350 around the X-axis, Y-axis or Z-axis in a predetermined angle ($\theta_X$, $\theta_Y$, or $\theta_Z$).

Referring back to FIG. 1, a vision unit 500 provided with a Charge Coupled Device(CCD) camera 520 is employed according to the embodiment of the present invention. The CCD camera 520 comprises a lens portion 510 for magnifying and focusing an image input through the lens portion 510 and transforming the detected image as an image signal and an interface 530 for transforming the image signal into a signal proper to the display 660 and outputs the transformed signal. The display 660 outputs the output signal from the vision unit 500 on a screen.

Meanwhile, the vision unit translator 620 translates the vision unit 500 linearly in the direction of the X-axis, Y-axis, or Z-axis according to a control signal from the translate controller 640. The translate controller 640 outputs the control signal to the vision unit translator 620 in a such away that an operator can monitor the alignment status of the first and/or second optical fiber array 720 and/or 770 through the display 660.

Figure 5:
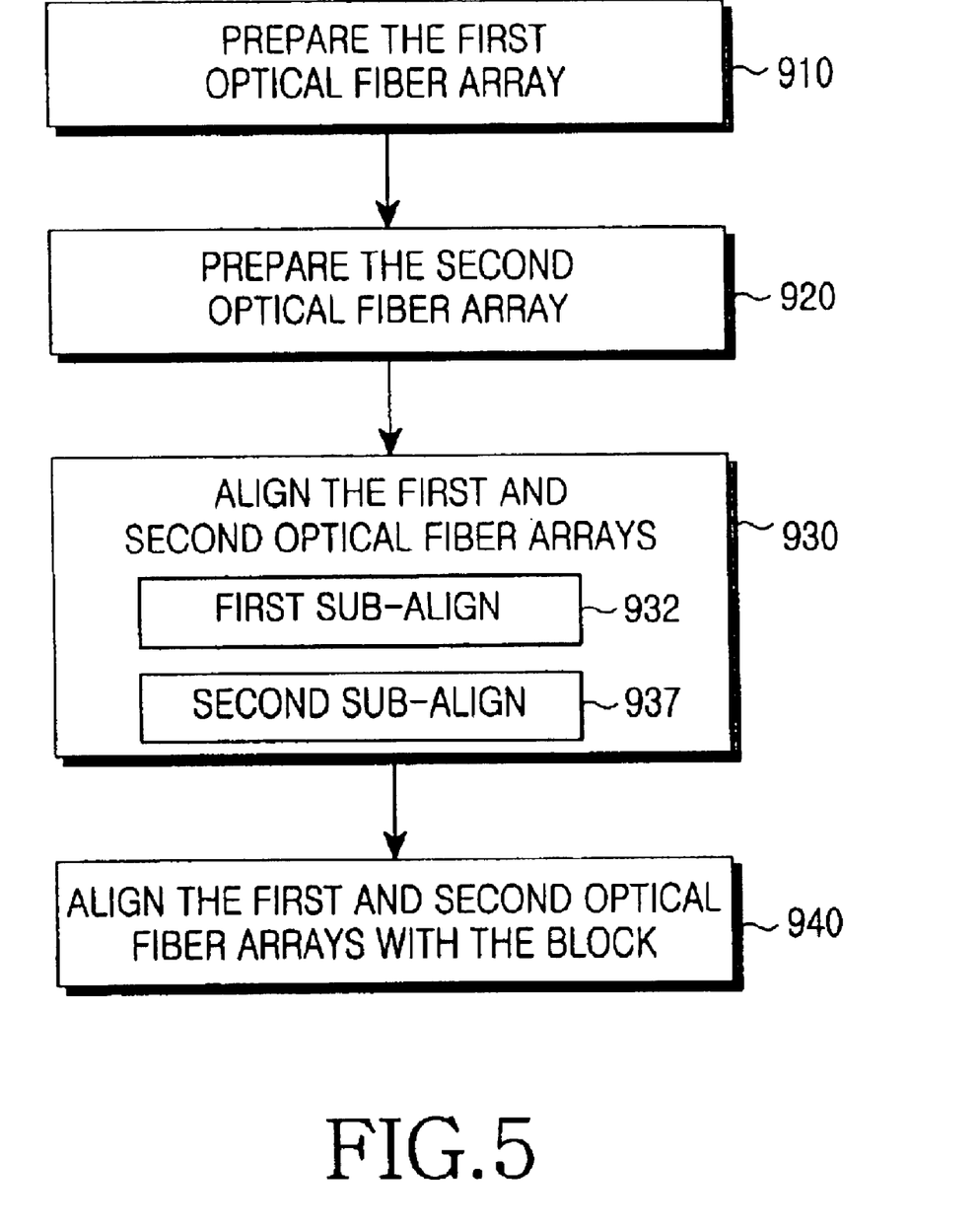
FIG. 5 is a flow chart illustrating an alignment method of the optical fiber alignment system in FIG. 1; and, FIGS. 6 to 8 are diagrams illustrating the alignment method disclosed in FIG. 5.
Figure 6:
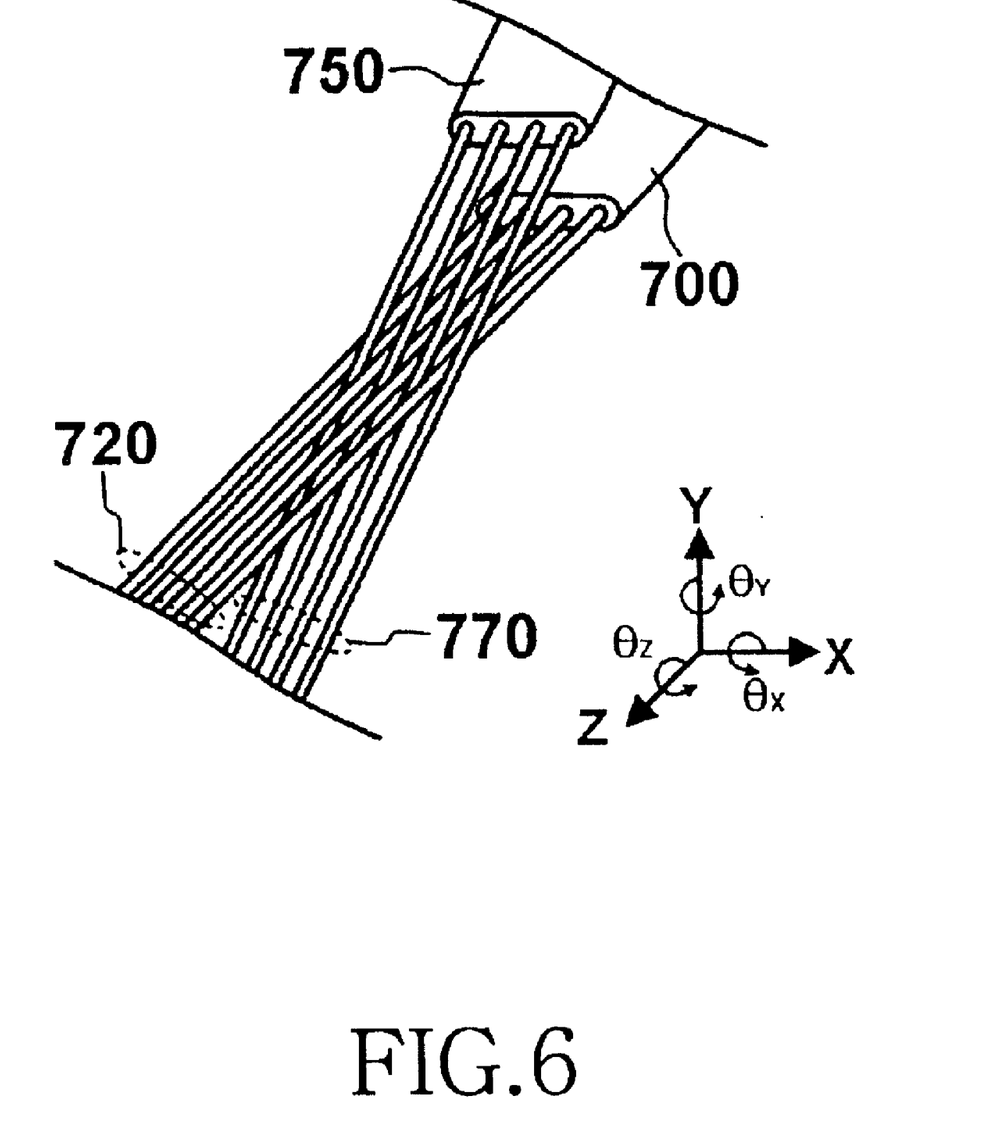
Figure 7:
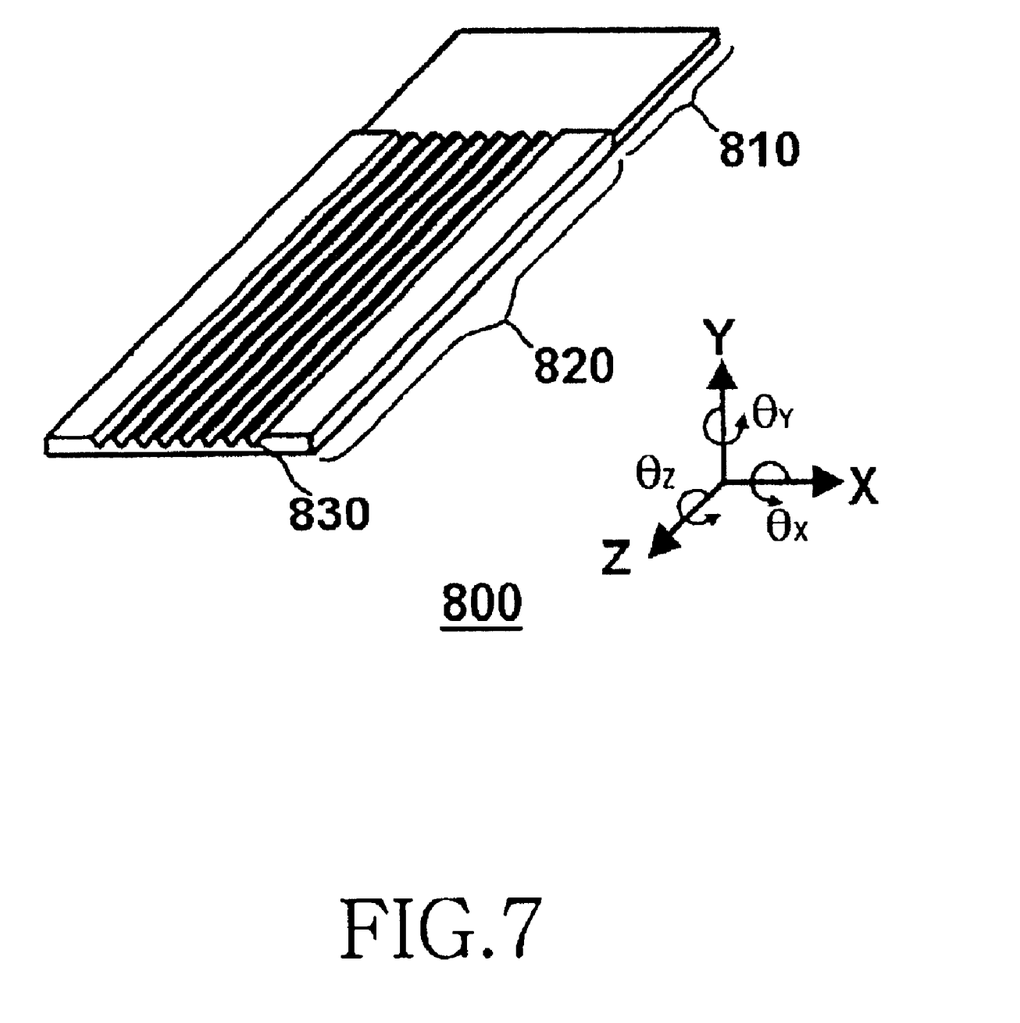
Figure 8:
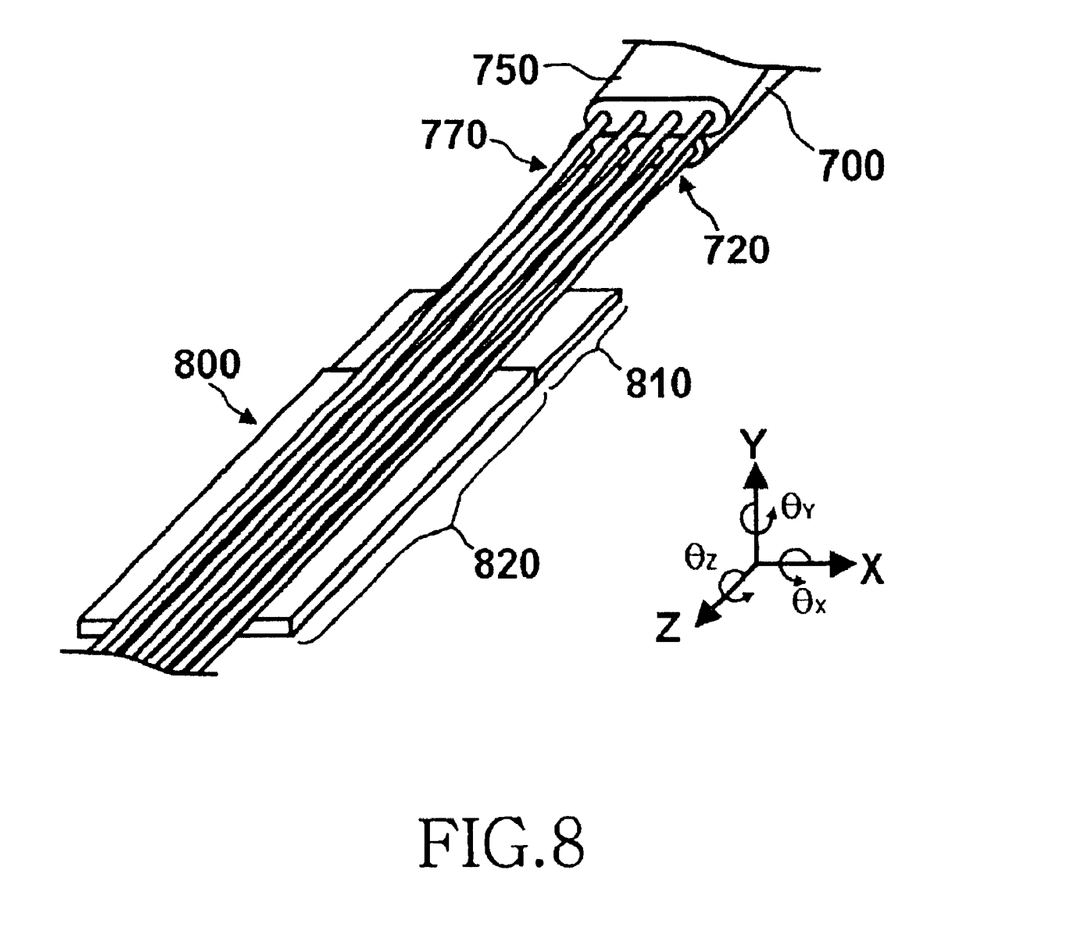

FIG. 5 is a flow chart illustrating an alignment method of mounting first and second optical fiber arrays on an optical fiber block having a plurality of grooves mounted thereon using the inventive optical fiber alignment system shown in FIG. 1. and FIGS. 6 to 8 are illustrative diagrams showing the alignment steps provided in FIG. 5. As shown in FIG. 5, the alignment method includes the steps of: preparing the first optical fiber array (step 910), preparing the second optical fiber array (step 920), aligning the first and second optical fiber arrays (step 930), and aligning the first and second optical fiber arrays with the block (step 940).

In the step of preparing the first optical fiber array (step 910), the first optical fiber ribbon 700 is mounted on the first jig assembly 100. At the same time, an angle relative to X-axis and a position relative to Z-axis of the end of the first optical fiber array 720 are measured using the vision unit 500.

In the step of preparing the second optical fiber array (step 920), the second optical fiber ribbon 750 is mounted on the second jig assembly 200. At the same time, an angle relative to X-axis and a position relative to Z-axis of the end of the second optical fiber array 770 are measured using the vision unit 500.

The step of aligning the first and second optical fiber array (step 930) further comprises first and second sub-aligning steps (932, 937). In the first sub-aligning step (932), the end of the second optical fiber array 770 is aligned with the end of the first optical fiber array 720 as shown in FIG. 6 by maneuvering the second X-Y-Z-$\theta_X$-$\theta_Y$-$\theta_Z$ stage 450 (or the first X-Y-Z-$\theta_X$-z$\theta_Y$-$\theta_Z$ stage 400). As such, after the first sub-aligning step (932), the end of the second optical fiber array 770 and the end of the first optical fiber array 720 are parallel to each other, and have the same position relative to Z-axis.

Thereafter, the second sub-aligning step (937) rotates the second optical fiber ribbon 750 around the X-axis at a predetermined angle $\theta_X$ using the second X-Y-Z-$\theta_X$-$\theta_Y$-$\theta_Z$ stage 450 and translates the second optical fiber ribbon 750 linearly along the Y-axis in order to interpose each optical fiber forming the second optical fiber array 750 to align between the adjacent optical fibers of the first optical fiber array 720, as shown in FIG. 6.

FIG. 6 shows the first optical fiber ribbon 700 comprising the first optical fiber array 720 and the second optical fiber ribbon 750 comprising the second optical fiber array 770. The second optical fiber array 770, for example, consists of 4 string optical fibers similar to the first optical fiber array 720 is interposed between the optical fibers forming the first optical fiber array 720. The second optical fiber 720 meets the first optical fiber array 720 in an oblique angle. Then, the second sub-aligning step (937) rotates the second optical fiber ribbon 750 backwardly around the X-axis in a reciprocal angle $\theta_X$ using the second X-Y-Z-$\theta_X$-$\theta_Y$-$\theta_Z$ stage 450, so that the second optical fiber array 770 is aligned with the first optical fiber array 720 side by side.

FIG. 7 shows an optical block 800 comprising equally spaced 8 V-grooves, for example. The block 800 consists of a body 820 equipped with the equally spaced 8 V-grooves on its upper surface and a supporting portion 810 extended from the body 820. The supporting portion 810 is different from the body 820 in its thickness. This thickness difference is set selectively so that the first and second optical fiber array 720, 770 can be mounted in a stable manner on the V-grooves 830.

The step of aligning the first and second optical fiber arrays with the block (940) is to measure an angle relative to X-axis and a position relative to Z-axis of the end of the V-grooves 830 formed on the upper side of the block 800 using the vision unit 500, align the end of the first and second optical fiber array 720 and 770 with the end of the V-grooves 830, and mount the first and second optical fiber array 720, 770 on the V-grooves 830. Here, the first and second optical fiber arrays 720, 770 are rotated around the X-axis at a predetermined angle $\theta_X$ and translated linearly along the Y-axis until they are mounted on the V-grooves 830 in a stable manner as shown in FIG. 8.

FIG. 8 shows the first and second optical fiber arrays 720 and 770 mounted on the block 800 in a stable manner according to the step of aligning the first and second optical fiber arrays with the block (940). As shown, the first and second optical fiber ribbons 700 and 750 are piled up, and the first and second optical fiber arrays 720 and 770 are aligned side by side on the block 800.

As described above, the optical fiber alignment system according to the present invention has advantages in that the optical fibers can be aligned on the block in a stable manner and easily using the X-Y-Z-$\theta_X$-$\theta_Y$-$\theta_Z$ stage and vision unit.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical fiber alignment system for mounting optical fiber arrays on an optical fiber block having a plurality of grooves, comprising:

jig assemblies, each including a first jig for receiving a part of the optical fiber arrays and a second jig having a plurality of vacuum holes formed on its upper surface for fixably attaching the other part of the optical fiber arrays;

X-Y-Z-$\theta_X$-$\theta_Y$-$\theta_Z$ stages for translating and rotating the respective jig assemblies in three dimensions to align the optical fiber arrays on the block;

a vision unit for outputting an image signal to monitor the aligning of the optical fiber arrays; and, a vision unit translator for translating the vision unit in 3D.

2. The optical fiber alignment system according to claim 1, further comprises a controller for outputting a control signal to the vision unit to monitor an alignment process.

3. The optical fiber alignment system according to claim 1, wherein the first jig comprises a metal substrate having a plurality of square-type grooves formed thereon and a cover having a magnetic property hinged at one end of the substrate.

4. The optical fiber alignment system according to claim 1, wherein the second jig comprises a plurality of square-type grooves mounted thereon, the plurality of grooves having a plurality of holes on the bottom surface thereof, and a first exhaust port formed at one end of the second jig.

5. The optical fiber alignment system according to claim 1, wherein the plurality of holes is connected to the first exhaust port, which is connected to a vacuum pump.

6. An optical fiber alignment system for mounting first and second optical fiber arrays on an optical fiber block having a plurality of grooves, comprising:

a first jig assembly for comprising a first jig for receiving a part of the first optical fiber array and a second jig having a first plurality of vacuum holes formed thereon, positioned apart from the first jig, for fixably attaching the other part of the first optical fiber array;

a first X-Y-Z-$\theta_X$-$\theta_Y$-$\theta_Z$ stage for translating and rotating the first optical fiber arrays in 3D;

a second jig assembly for comprising a third jig for receiving a part of the second optical fiber array and a fourth jig having a second plurality of vacuum holes formed thereon, positioned apart from the third jig, for fixably attaching the part of the second optical fiber array;

a second X-Y-Z-$\theta_X$-$\theta_Y$-$\theta_Z$ stage for aligning the aligned first and second optical fiber arrays on the block together with the first X-Y-Z-$\theta_X$-$\theta_Y$-$\theta_Z$ stage, after inserting the second optical fiber array into apertures of the first optical fiber array and aligning by translating and rotating the second optical fiber array in 3D;

a vision unit having an image detector for outputting an image signal for an input image to monitor the aligning of the optical fiber arrays and a display for displaying the image signal on a screen; and, a vision unit translator for translating the vision unit in 3D.

7. The optical fiber alignment system according to claim 6, further comprises a controller for outputting a control signal to the vision unit translator so that an alignment status of the first and second optical fiber arrays can be confirmed through the display.

8. The optical fiber alignment system according to claim 6, wherein the first jig comprises a metal substrate having a plurality of square-type grooves formed thereon and a cover having magnetic property hinged at one end of the substrate.

9. The optical fiber alignment system according to claim 6, wherein the second jig comprises a plurality of square-type grooves mounted thereon, the plurality of grooves having a plurality of holes on the bottom surface thereof, and a first exhaust port formed at one end of the second jig.

10. The optical fiber alignment system according to claim 9, wherein the plurality of holes is connected to the first exhaust port, which is connected to a vacuum pump.

11. The optical fiber alignment system according to claim 6, wherein the first and the second X-Y-Z-$\theta_X$-$\theta_Y$-$\theta_Z$ stages are operative to interpose each fiber of the second optical fiber array to align between adjacent optical fibers of the first optical fiber array.

* * * * *